UNITED STATES PATENT OFFICE.

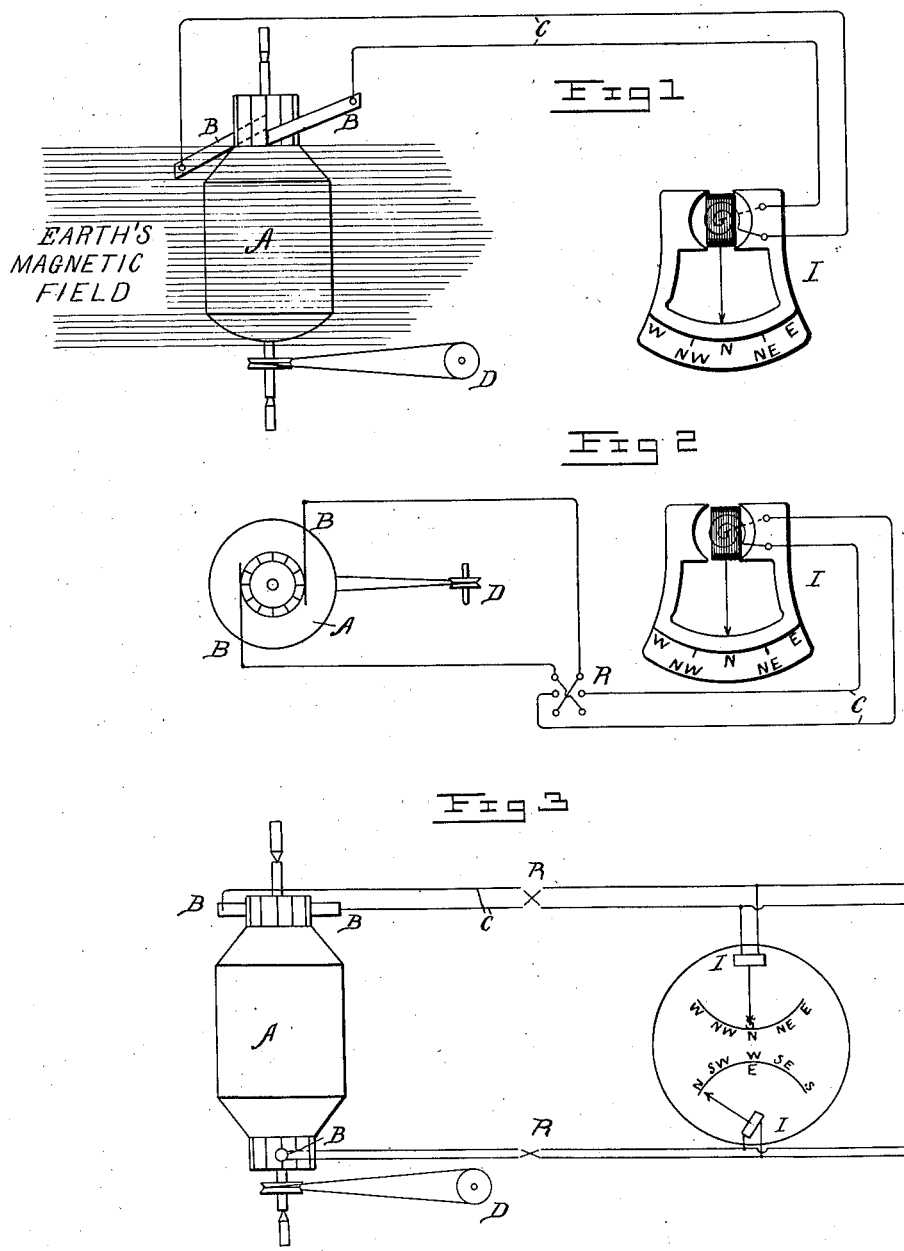

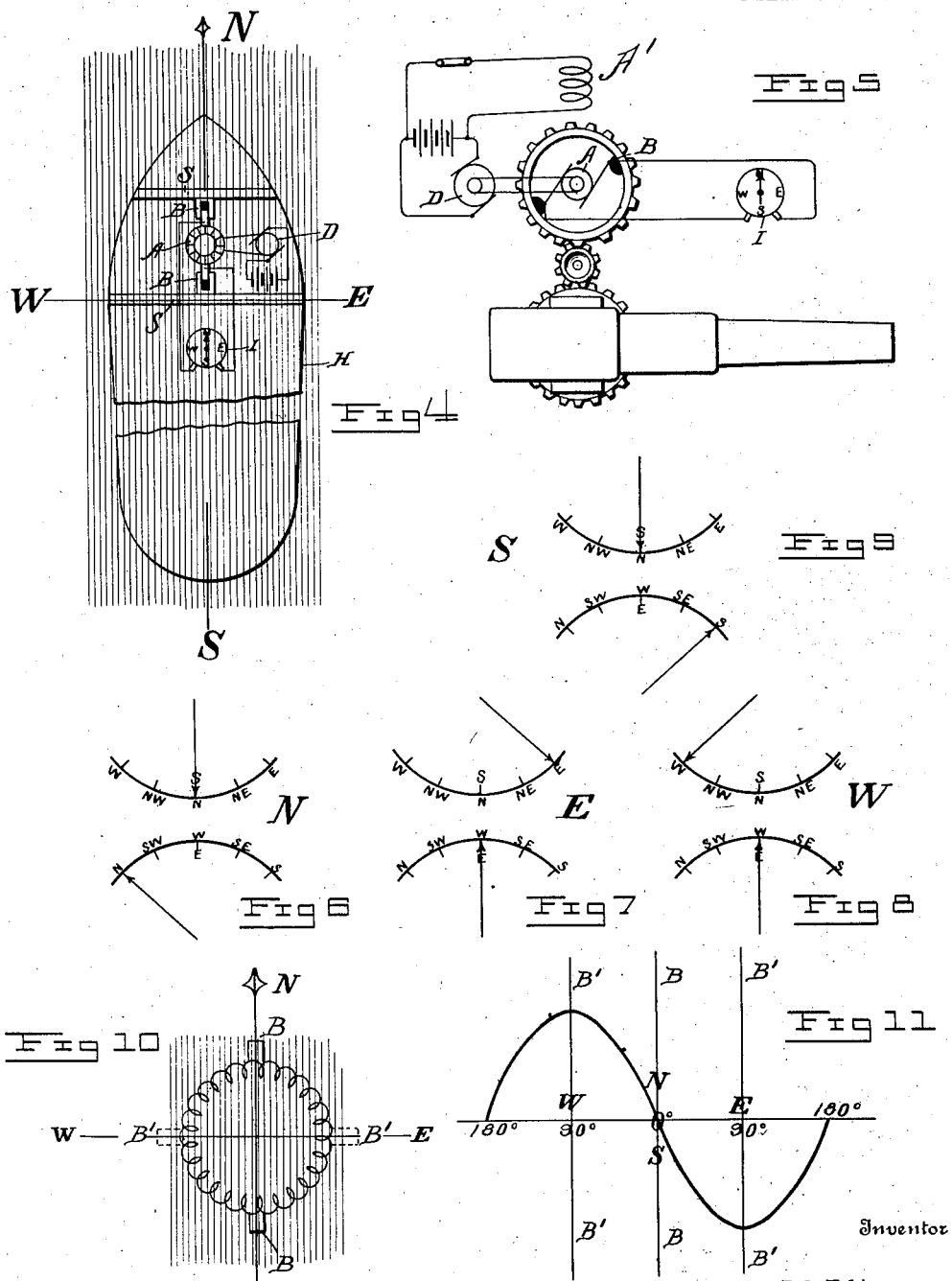

DONALD M. BLISS, OF STAMFORD, CONNECTICUT, ASSIGNOR OF ONE-HALF TO CHARLES J. HENSCHEL, OF NEW YORK, N. Y.

DEVICE FOR DETERMINING DIRECTION.

1,047,157.  Specification of Letters Patent.  Patented Dec. 17, 1912.

Application filed March 31, 1909. Serial No. 487,055.

*To all whom it may concern:*

Be it known that I, DONALD M. BLISS, a citizen of the United States, residing at Stamford, in the county of Fairfield and State of Connecticut, have invented new and useful Improvements in Devices for Determining Direction, of which the following is a specification.

My invention consists of an electrical device for determining the direction of movement of a moving body. It is intended particularly for use on shipboard though it may be used on board any vessel, vehicle or moving body where there is need for it. It may be used in conjunction with a compass or other device for determining direction, or it may be used alone. As is well known, the ordinary magnetic needle used for a compass is subject to variations in the magnetic field of the earth, these variations being brought about by many causes such as sun-spots or the presence of heavy bodies of magnetic minerals or ores in the neighborhood where the compass is being used. These variations cannot be checked, except by swinging the ship or turning about the moving body, or by taking astronomical readings, and it may be in a given instance that it is impossible to use any of these means for checking the compass. For instance, weather conditions may be such that the ship or moving body cannot be swung around, and the sky may be so overcast that astronomical readings are impossible. By the use of my invention the reading of a compass can be checked in a moment. Not only is this true, but the device which I use in carrying out my invention will check itself, this checking being automatically accomplished in the preferred form of my device.

My invention may also be used alone as a regular means of determining direction, or may be used as an auxiliary being put into service only upon the failure of the compass due to disturbances in the magnetic field, or to disarrangement or disablement due to any other cause.

When used alone my invention provides a ready and extremely accurate means of determining direction, giving continuous readings in the same manner as does a compass in normal operation.

My invention possesses the further advantage that its indications can be transmitted to any point whatsoever on the body upon which it is placed, be that body a moving body or a stationary one. Not only is this true, but indications may be had from a single device at as many points as desired.

My invention is capable of other uses, several of which will be mentioned in connection with the description following.

In carrying out my invention I provide a means for generating an electrical current varying in intensity dependent upon the direction of movement of the moving body by the use of the magnetic field of the earth, and I pass this current so generated through a device adapted to indicate its magnitude, the said device being preferably calibrated in degrees instead of electrical units.

The accompanying drawings show in Figure 1 my device in its simplest form; in Fig. 2 my device provided with means for checking indications; in Fig. 3 an elaborate form of my device whereby readings may be obtained around the entire compass; in Fig. 4 the mounting of my device on shipboard; in Fig. 5 the application of my device as a range indicator or finder, and in Figs. 6 to 9 inclusive the scale indications of the device of Fig. 3; and in Figs. 10 and 11 are shown diagrammatically certain characteristics of the electrical device.

Referring to these drawings, A is the armature of a dynamo machine. This machine is mounted vertically on the moving body in a fixed support, or may be mounted in a swinging support adapted to be moved so that the armature may be placed in a position with its axis at right angles to the direction of the magnetic field of the earth. The armature A in the embodiment of the invention shown in Fig. 1, is provided with commutator and brushes B, B, which are fixed to the moving body and bear upon the commutator. Leads or connections C are connected to the brushes B, B, and to an indicator I placed at a suitable point. This indicator may be any form of milliampere meter, millivolt meter, or galvanometer suitable for indicating very small electric currents. A driving motor D is geared to the armature A to drive it at a suitable speed. The armature A is wound with many turns of fine wire, and when revolved in the earth's magnetic field has developed in it an electromotive force which is constant in amount provided the driving speed is constant and there is no change in the intensity of the earth's magnetic field. This maximum voltage is available at only one position of the brushes B, B, bearing on the commutator, that is, the position in which the diameter connecting them is at right angles to the magnetic field. As the brushes are moved around the commutator, the voltage falls off until when they are in a position at right angles to that shown, that is, the position where the diameter connecting them is parallel to the magnetic field, there is no electromotive force available at the brushes, although a maximum and constant electromotive force continues to be generated in the armature A. By mounting the brushes B, B, in fixed relation to the moving body the diameter connecting the points of contact with the commutator and the rotating armature is moved with respect to the earth's field as the moving body moves, thus changing the electromotive force at the brushes as the body changes its position with respect to the magnetic field of the earth. By connecting the indicating instrument I to the brushes, I obtain in the circuit of the indicating instrument a current whose magnitude varies as the moving body changes its position, and whose magnitude is measured by the indicating instrument. By calibrating this instrument to read in degrees and marking thereon the points of the compass instead of electrical units, the instrument will accurately indicate the direction of the moving body with respect to the earth's magnetic field.

In Fig. 4, I have shown my invention as applied to a ship to be used in conjunction with or instead of a compass. As in Fig. 1, A indicates the revolving armature and B, B, the brushes bearing thereon, D the driving motor and I the indicator, all mounted on the ship whose hull is represented in outline H. The brushes B, B, are shown as radial brushes mounted in supports S, S, and parallel to the longitudinal axis or keel of the ship. The indicator I may be placed at any convenient point on the ship. With the earth's magnetic field as shown and the keel of the ship being parallel with that field, there will be no current through the indicator I, because the brushes like the ship are in a line parallel to the magnetic field. The pointer of the indicating instrument will, therefore, indicate north as shown, the scale of the instrument illustrated having three positions, north, east and west. Assume, however, that the ship is turned and headed northwest. The keel of the ship and the brushes B, B are no longer in a line parallel to the magnetic field, but in a line at an angle to it. There will be a voltage at brushes B, B, therefore, which corresponds to this angular position, and a corresponding current will pass through the indicating instrument causing it to turn counter-clockwise and assume a position indicating northwest. If the ship is turned through ninety degrees from the position shown, or to a westward course, the indicating instrument is actuated by a maximum current, there being now maximum voltage at the brushes B, B, and the indication being west. If the ship instead of being turned to the west is turned to the east, the indicating needle will turn from north to east, being impelled by a current through the indicating instrument in a reverse direction, it being well known that the movement of the brushes of the dynamo machine in a direction counter-clockwise from the point of zero electro-motive force gives at the brushes an electro-motive force of one polarity while movement in a clockwise direction from the point of zero electro-motive force gives an electro-motive force at the brushes of opposite polarity.

The device thus far described is adapted to indicate direction only through 180°, 90° on each side of the true north or true south, and is not adapted for the full scale of the compass or to distinguish between north and south. The reason for this will be obvious upon consideration of the electro-motive force curve of the dynamo armature in connection with the several positions of the brushes around the commutator.

Referring to Figs. 10 and 11, in Fig. 10 is shown diagrammatically an armature A. The full line position B, B is the position of the brushes in which no electro-motive force is available, and the dotted line position B', B' is the position at which maximum voltage is available. These positions are indicated on the curve of electromotive force at the brushes in Fig. 10 by the straight lines B, B, and B', B'. The position B, B corresponds to the north or south indication, and is so marked N and S. The positions B', B' are the east and west positions and are marked E and W respectively. The lines B', B' pass through the maximum points of the curve. The angular distance through which the brushes B, B have been turned is 180° between east and west. This maximum point in each case is 90° from the point of zero electromotive force, and when the brushes are turned more than 90° or beyond this maximum point the electromotive force while of the same polarity decreases, causing a corresponding decrease in the current traversing the indicating instrument, and the indicating pointer will therefore simply fall back toward the north instead of continuing movement to a new indication which might be called south. Thus to take a specific example, assume the needle to be indicating north and the ship to be turned to the east, carrying the brushes to position B', B' in a clockwise direction. The indication at this point would be maximum, but if the ship is turned in a clockwise direction beyond the east toward the southeast, and from southeast to south, the electro-motive force falls off while it remains of the same polarity as reference to Fig. 10 will show, and the needle of the indicating instrument simply returns slowly from east to north. Unless the instrument were watched closely, therefore, there would be no way of telling whether the ship were pointing north or whether the ship were pointing south. I overcome this objection to the simplest form of my device by constructing the armature A with two separate windings, each provided with a commutator and brushes B, B, and arranging these brushes in quadrature with each other. This form of my invention is illustrated in Fig. 3, and I show in connection with it a double or compound indicating instrument in which use is made of two galvanometers, one connected to each armature winding. The brushes being in quadrature with each other there will always be a difference in phase of 90° between electromotive force available at the respective brushes B, B. Thus when the electromotive force available at one set of brushes is zero and its corresponding indicating instrument points to north as shown, the electromotive force at the other set of brushes in quadrature therewith is maximum and it indicates north also, but points to one of the extreme ends of its scale instead of to the central point of its scale as does the first needle. With the scales marked as shown, and assuming a turning of the ship or other moving body from north to east, the pointers will take the positions shown in Fig. 7, which indication means east. If the ship is turned through another 90° in a clockwise direction to the south, the indication is as shown in Fig. 9, and Fig. 8 represents the indication west. It will be observed that the one needle has remained 90° behind the other needle in all positions, and that each of the indications north, east, south and west shown in Figs. 6 to 9 inclusive is different from each other indication. By similarly drawing diagrams, and assuming the ship to be turned about counter-clockwise instead of clockwise, a set of indications of the instruments identical in all respects to those shown in Figs. 6 to 9 will be obtained. Thus by using two windings on the armature and mounting the brushes in quadrature with each other, I have obtained a means of obtaining readings around the entire circle. In positions intermediate the cardinal points of the compass, the indications are definite for each definite position.

It is to be noted that the single indicating device shown in Fig. 1 will give accurate indications over two quarters of the compass or through 180°. Each of the instruments of the compound indicating device just described also gives, over its own scale, accurate indications of direction through 180° of the compass. The scale of each instrument is accurately laid off in points of the compass in two adjacent quarters, the scale of one instrument being laid off in quarters from west to east by way of north, and the scale of the other instrument being laid off from west to east by way of south, except for the fact that scales of each quarter of the compass are reversed with respect to each other, and the indicia of the opposite ends of the scale are made "North" and "South" in order that they may correspond with indicia at the center of the other scale. Both indicating pointers thus point to the same indicia for the main points of the compass and there is little danger whatever of confusion arising through misreading of the indications. This is clearly shown in Figs. 6 to 9. Further, by virtue of the changing of the indicia on the ends of the second scale, the pointers at all times give an accurate indication of the quarter in which the vessel or other body is pointing, and from which readings are to be taken on the scales of the device. Thus referring to Fig. 6, when the pointers are in the northeast and southwest quarters of the scales or between the positions shown in Figs. 6 and 7, it is clear that the ship is pointing in the northeast quarter and that readings are to be taken in the northeast quarter of the scale as marked. The end indicia of the scales adjacent the quarters southwest and northeast in which the needles lie, are, under the conditions assumed, N and E, indicating on the face of the instrument that readings at this time are to be taken from that quarter of the scale marked N E. So also when one needle is in the northeast quarter of the scale and the other is in the southeast quarter readings are to be taken from the southeast quarter as the ends of the scales adjacent the quarters northeast and southeast are marked S and E respectively. And so the indications are given around the entire compass, both needles simultaneously indicating the cardinal points on the compass, and one needle acting in conjunction with the other to indicate the quarter of the compass from which readings are to be taken. Face readings, or readings directly from the face of the indicating instrument can be had at all times.

The indications of this device just described extending as they do around the entire compass, the device lends itself admirably for the purpose of checking the ordinary magnetic mariner's compass, as the indicating instrument may be placed alongside the compass and readings compared directly with ease. The device just described automatically checks itself by reason of the fact that both indicating needles are active at the same time. A glance at the scales of the instrument will show that when one needle indicates northeast position, the other needle, if the device is accurately adjusted, should indicate southwest, the 90° phase displacement being constant. Besides this means, however, I have provided a reversing switch R in the circuit of each indicating instrument. This reversing switch is preferably of the push button type, and is so arranged that it may be momentarily pressed to reverse the current in the indicator, and then released to restore the current to its normal direction. When the current is so reversed, the indicating needle, if the instrument is properly adjusted and there is no disturbing influence acting upon the device, should throw just as far to the one side of its central position as it does on the other. Thus if the needle of the upper scale indicated northeast, when the reversing switch is pressed, it should throw to a position indicating southeast. This reversing switch is a very quick and accurate means of testing the accuracy of each instrument. These reversing switches enable the device to be used for a purpose other than that of indicating the direction of moving bodies, and that purpose is the detection of bodies of magnetic material which may be in the vicinity of the device. The presence of a large body of magnetic material will distort the earth's field in such a manner as to produce a distortion of the electromotive force curve of the armature A. If the brushes are accurately set this distortion of the magnetic field may be determined by checking the indications of the indicating instruments. The instruments will, if observed, indicate any sudden or gradual changes in the magnetic field caused by the movement of a magnetic body near the ship when the ship's course is straight. Thus the device lends itself to the detection of the presence of warships, submarines, or any other ship of steel construction.

Generally speaking, my device, as has been said, is capable of many applications. In Fig. 5 I have shown its application as a range finder for a large gun. The armature A is mounted at any suitable point near the gun and the brushes B, B, are fixed to an annulus Y geared to the central trunnion or support on which the gun turns. The brushes are thus moved with respect to the earth's field as the gun is turned. The brushes may, of course, be geared to the turret in which the gun is mounted, and the gears being suitably proportioned, the results will be the same. Likewise my device may be applied to telescopes, or may be used for signaling purposes between guns placed at some distance from each other, it being possible to place the indicator at any desired point.

Other uses and modifications of my device will readily occur to skilled engineers. It is, of course, obvious that I may use electrical induction means of a form other than that of the armature A, and that the form of current collecting means may also be varied. If I desire, I may use two sets of brushes B, B, in quadrature with each other and bearing upon the same commutator. I may use a driving motor geared to the armature, or I may connect the driving motor direct to the armature, depending upon the requirements of a particular case. Likewise, the form of indicating instrument may be anything desired. It is also to be noted that in using my device in connection with telescopes or guns mounted on stationary supports I may use a magnetic field other than the earth's field set up in any desired manner in order to excite the rotating element of my device. As shown in Fig. 5, A' indicates an artificial magnetic field of constant intensity supplied from the same source of power which supplies the motor D. In fact, this would be the preferable arrangement when my device is so used. I desire to cover all such modifications and uses in the claims annexed hereto.

What I claim is:

1. An apparatus of the character described comprising a body whose direction is to be determined, a dynamo armature mounted on said body and rotatable in the magnetic field of the earth, an indicating instrument comprising two meters each provided with a scale laid off to tell the points of the compass in two adjacent quarters, and pointers indicating separately on said scales, and current collecting devices connected to each meter and associated with the aforesaid armature, said current collecting devices being fixed in position on said moving body and bearing a 90 degree relation to each other, whereby the said meters of the indicating instrument by their conjoint indication, designate the quarter of the compass in which the body is heading.

2. An apparatus of the character described, comprising a body whose direction is to be determined, a dynamo comprising an armature rotatable in the magnetic field of the earth, an indicating instrument comprising two meters each provided with a scale laid off to tell the points of the compass in two quarters, and pointers indicating separately on said scales, current collecting devices associated with the aforesaid armature and having a fixed angular relation to the aforesaid body and movable therewith, and connections from each meter of the indicating instrument to a current collecting device, said current collecting devices having a 90 degree angular relation with respect to each other whereby the said meters by their conjoint indication designate the quarter of the compass in which the body is heading.

3. In a device for determining direction, means for generating electric energy by the use of the magnetic field of the earth, an indicating means, and means for passing through said indicating means energy derived from said source and varying in amount in accordance with the position of the body whose direction is to be determined, and means for determining the accuracy of the indications of said indicating means, and for determining the presence of magnetic material in the vicinity of the device.

4. In a device for determining direction, means for generating electric energy by the use of the magnetic field of the earth comprising an electrical conductor moving in said field, an indicating means, means for passing through said indicating means energy derived from said generating means comprising connections from said indicating means to said moving conductor bearing a fixed relation to the body whose direction is to be determined, and a reversing switch in said connections for determining the accuracy of the indications of said indicating means, and for determining the presence of magnetic material in the vicinity of the device.

5. In a device for determining direction, a dynamo for generating electric energy by the use of the earth's field comprising an armature rotating in said field, an indicating means, brushes having a fixed relation to the body whose direction is to be determined coöperating with said armature and connected to said indicating means, and a reversing switch in said connections for determining the accuracy of the indications of said indicating means, and for determining the presence of magnetic material in the vicinity of the device.

6. In a device for determining direction, the combination of a dynamo provided with an armature rotating in the magnetic field of the earth, an indicating means comprising two galvanometers, two sets of brushes located in quadrature with each other and in coöperative relation to said armature, said brushes having a fixed relation to the body whose direction is to be determined, connections from each of said galvanometers to a set of brushes associated therewith, and a reversing switch connected with each pair of said connections for enabling the operator to determine the accuracy of indications made by said galvanometers.

7. In a device of the character described, in combination, an armature having many turns of wire revolving at a relatively high speed in the magnetic field of the earth, current collecting means in operative relation to the said armature, indicating means connected thereto, and means for determining the accuracy of the indications of said indicating means, and for determining the presence of magnetic material in the vicinity of the device.

In testimony whereof I have hereunto set my hand in presence of two subscribing witnesses.

DONALD M. BLISS.

Witnesses:
Chas. J. Henschel,
Otto Henschel.